(No Model.)

A. CROSS & A. C. WREDE.
TIRE PROTECTOR.

No. 598,559. Patented Feb. 8, 1898.

WITNESSES:
A. D. Harrison
P. W. Pizzetti

INVENTORS:
Abraham Cross
Albin C. Wrede
by Wright Brown & Quinby
Attys

UNITED STATES PATENT OFFICE.

ABRAHAM CROSS AND ALBIN C. WREDE, OF HOUSTON, TEXAS.

TIRE-PROTECTOR.

SPECIFICATION forming part of Letters Patent No. 598,559, dated February 8, 1898.

Application filed March 20, 1897. Serial No. 628,387. (No model.)

*To all whom it may concern:*

Be it known that we, ABRAHAM CROSS and ALBIN C. WREDE, of Houston, in the county of Harris and State of Texas, have invented certain new and useful Improvements in Tire-Protectors, of which the following is a specification.

This invention has relation to armor for pneumatic tires; and it consists in a protective strip of peculiar construction adapted to be inserted between the air-containing portion of the tire and the tread portion thereof, so as to prevent puncture from sharp articles, such as nails and stones.

We shall now proceed to describe and claim our improvements, reference being had to the accompanying drawings, in which—

Figure 1:
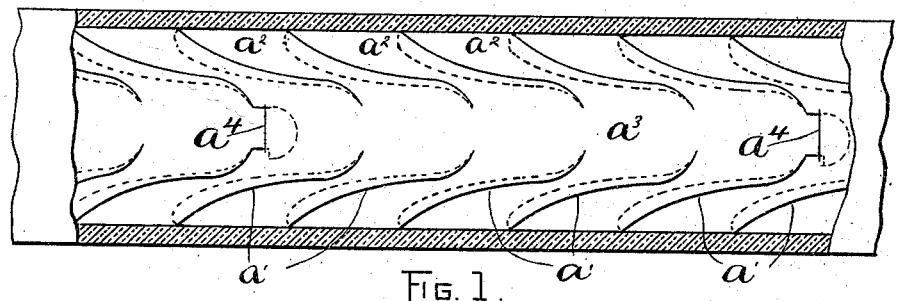
Figures 2, 3:
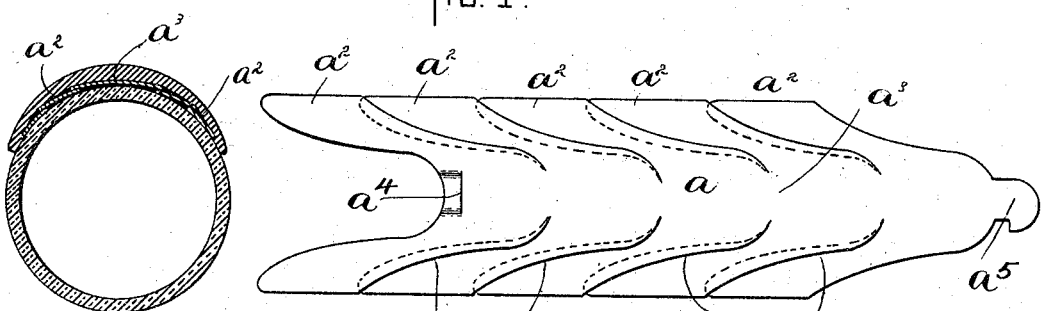
Figure 4:
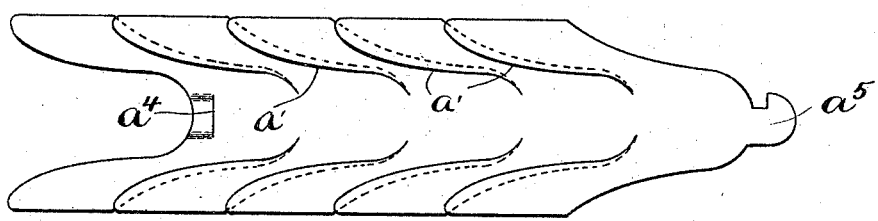
Figure 5:
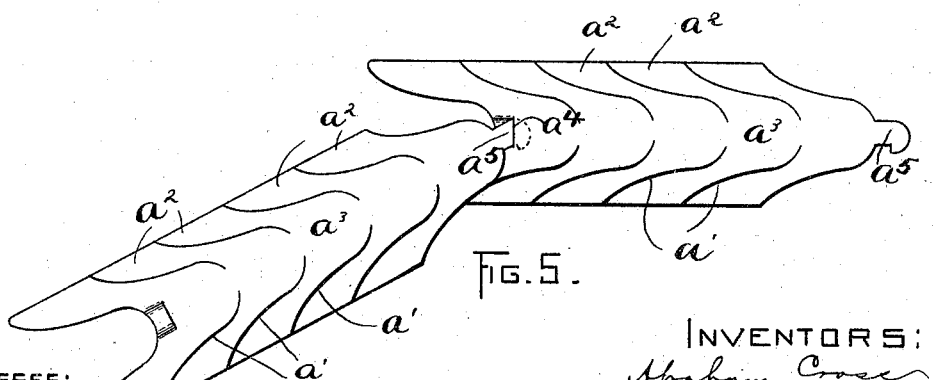

Figure 1 is a partial top view of a tire provided with our improved armor, the tread portion being shown broken away to expose the armor. Fig. 2 is a cross-sectional view of the armored tire. Fig. 3 is a top view of one of the sections of the armor. Fig. 4 is an under view of the same. Fig. 5 is a view showing the method of connecting two of the sections of the armor together.

The same letters of reference indicate the same parts in all the figures.

Referring to the drawings, $a$ designates a protective strip composed of a single piece of thin metal—such as steel, brass, aluminium, &c.—and formed with incisions $a'$ $a'$ along its margins, which divide the said margins into a number of scales or flaps $a^2$ $a^2$, attached at their bases to a central continuous portion $a^3$. These incisions are preferably made in a slanting direction, so as to form a series of elongated scales possessing a large degree of flexibility. When the protective strip is dished and curved to conform to the shape of the tire, these scales overlap at their edges, so as to present a surface through which it will be practically impossible for a nail to pass. The overlapping of the edges may be increased and made permanent by manipulating and hammering the strip upon a suitable form.

Each strip $a$ is provided at one end with a flat hook $a^5$ and at the other end with a transverse slit $a^4$ of proper dimensions to receive a hook in the manner shown in Fig. 5 and to retain the same when the two consecutive strips are in alinement. It will be observed that by this manner of connecting the strips together provision is made for their relative movement in the direction of their length, and this is of much importance in the interest of flexibility and elasticity of the tire, for thereby the displacement of the protector incident to pressure on the surface traversed is confined to one or two of the strips, in the flattening of which a sliding of one strip over its neighbor takes place. By such an arrangement the protector is prevented from appreciably diminishing the elasticity of the tire, and in this particular is superior to a single encircling strip, as will be apparent. The armor may be interposed between two layers of the tire in the process of manufacture, or it may be made applicable to ordinary tires by a suitable retaining device, such as a rubber covering secured at its edges to the tire by means of cement or by being vulcanized thereto.

Protective bands as ordinarily constructed have been made of a large number of independent small pieces or scales either pivoted together or retained in place by upturned flanges or some similar method; but the two principal objections to these devices are their cost and the stiffness which they impart to the tire.

Our device can be very cheaply made, and it possesses the maximum degree of resiliency consistent with its protective qualities.

We claim—

1. A protecting device for pneumatic tires, consisting of a series of elongated metal strips adapted to be interposed between the air-confining portion of the tire and the tread portion thereof, the said strips each consisting of a single piece of metal formed with incisions along its margin dividing said margin into a number of contiguous scales, and the said strips having interlocking portions at their ends with provision for relative longitudinal movement substantially as and for the purpose described.

2. A protecting device for pneumatic tires consisting of a series of interlocking metal strips adapted to be interposed between the air-confining portion of the tire and the tread portion thereof, each strip having a hook at one end lying in the same plane as the strip itself and a transverse incision near the opposite end with a depression on one side of the incision, substantially as and for the purpose described.

In testimony whereof we have signed our names to this specification, in the presence of two subscribing witnesses, this 9th day of March, A. D. 1897.

ABRAHAM CROSS.
ALBIN C. WREDE.

Witnesses:
A. E. STERNENBERG,
MAX SCHMIDT.